United States Patent [19]

Rice

[11] Patent Number: 5,678,163

[45] Date of Patent: Oct. 14, 1997

[54] METHOD FOR MAKING AN AIRBAG INITIATOR

[76] Inventor: Eldon D. Rice, 1959 N. Jackson St., Chandler, Ariz. 85225

[21] Appl. No.: 513,348

[22] Filed: Aug. 10, 1995

[51] Int. Cl.⁶ .................... B22F 3/10; B22F 5/00
[52] U.S. Cl. .................... 419/2; 419/23; 419/26; 419/28; 419/37; 419/54
[58] Field of Search .................... 419/2, 23, 26, 419/28, 37, 54

[56] References Cited

U.S. PATENT DOCUMENTS

| | | | |
|---|---|---|---|
| 4,422,381 | 12/1983 | Barrett | 102/202.2 |
| 5,131,679 | 7/1992 | Novak et al. | 280/736 |
| 5,140,906 | 8/1992 | Little, II | 102/202.14 |
| 5,269,056 | 12/1993 | Yang et al. | 29/879 |
| 5,454,320 | 10/1995 | Hilden et al. | 102/202.7 |

Primary Examiner—Charles T. Jordan
Assistant Examiner—Daniel Jenkins
Attorney, Agent, or Firm—Harry M. Weiss; Jeffrey D. Moy; Harry M. Weiss & Associates, P.C.

[57] ABSTRACT

The present invention relates to an improved method of manufacturing an airbag initiator. Currently, an airbag initiator is comprised of three parts made out of two dissimilar materials plus a glass to metal seal. The present method builds the same airbag initiator with the body and the pins in one piece via a process called metal injection molding. The part is then placed in a furnace to remove a wax binder, then the temperature is ramped up slowly to remove a thermoplastic layer, and the temperature is further ramped up to form a sintered part. The sintered part being equal to or better than standards of wrought material. The initiator is then removed from the furnace and a glass bead is placed in a void area in the body of the initiator. The glass is melted forming a glass to metal seal between a first pin and the body of the initiator. A top portion of the initiator is then lapped off isolating the first pin from the body of the initiator. A bridge wire is welded to the first pin and the body of the initiator yielding the completed airbag initiator.

27 Claims, 2 Drawing Sheets

METHOD FOR MAKING AN AIRBAG INITIATOR

BACKGROUND OF THE INVENTION

1. Field of the Invention

This invention relates generally to motor vehicle parts and, more specifically, to a new method of making an airbag initiator. The initiator ignites an explosive which, in turn, ignites a material which forms into a gas for inflating the airbag in the motor vehicle when the motor vehicle is involved in an accident.

2. Background of the Invention

An airbag initiator is the primary part required to inflate an airbag of a motor vehicle. The airbag initiator has a very fine bridge wire which is coupled to the body of the airbag initiator. When the airbag needs to be inflated, an electrical current comes to the bridge wire which causes the bridge wire to heat up to a high temperature and/or to a glow. This ignites an explosive which, in turn, ignites a material that forms into a gas for filling the airbag.

Until now, the airbag initiator was comprised of three parts of dissimilar material and required manual handling. The body of the airbag initiator, which is made from 304L stainless steel, is machined from rod stock on a lathe to the proper diameter and to put a flare at the base of the body for future welding. The body is then moved to a mill where a hole is drilled through the body eccentric to the outside diameter of the body.

A pin, which is made of nickel iron (NiFe), needs to be placed in the hole (eccentric or concentric) in the body and it protrudes out from each end of the body. The bodies of the airbag initiators are placed into a box and shaken by hand so the bodies fall into position. Another box with the NiFe pins is placed on top of the box with the aligned airbag initiator bodies. The top box is then shaken by hand so that a single pin will fall into the hole drilled through the body of the airbag initiator.

A glass bead is placed over the pin and slid down the pin into the hole, or a glass powder is placed around the pin in the hole, thereby filling the hole. The airbag initiator is then placed in a furnace to melt the glass thereby filling the hole and bonding the glass to the pin and to the body to form a glass to metal seal. The glass to metal seal acts as an insulator and isolates the pin from the body of the initiator. After removing the airbag initiator from the furnace, the airbag initiator is placed in a tumbler or acid bath to remove any oxidation that may have formed on the airbag initiator during the heating in the furnace. The top of the airbag initiator is then ground or lapped to flatten the top surface of the airbag initiator so that a bridge wire can be resistance welded to the body and the isolated pin on the same plane. Another pin is then attached to the bottom of the body, after the location of the pin has been located to maintain the tolerance between the two pins (i.e. +/−0.002").

The above process is both time consuming and expensive. Furthermore, the above process presents several other problems for the airbag initiator manufacturer. During the production process of the airbag initiator, burrs form on the body of the airbag initiator after lapping or grinding. The burr(s) have to be removed before assembly due to the tight tolerances and/or interference in assembly or production. The burrs can also hang up parts in the production machinery causing the machinery to seize up, thereby stopping production. The 304L stainless steel body is also very susceptible to carbon and oxidation during the furnace heating. The carbon particles, which fall off during production, have a tendency to clog the machinery.

Another problem with the current method of manufacturing an airbag initiator is that the NiFe pins are soft and easily bent. The welded pins often break during the processing, handling, or testing of the airbag initiator. The NiFe pins are also more susceptible to rust than the stainless steel body. Furthermore, because the pins are made out of NiFe and the body of the airbag initiator is made out of stainless steel, different welding parameters are required.

Since each pin is manually coupled to the body of the initiator, the quality of the part will vary from part to part and from vendor to vendor. Furthermore, since the tolerance between the two pins is only plus or minus 0.002 inches, many airbag initiators do not pass quality control because of the misalignment of the pins. Since it is too expensive to try to remove and relocate the pins, the parts are scrapped resulting in a loss of production to the manufacturer.

Therefore, a need existed to provide an improved method of making an airbag initiator. The new method must manufacture the airbag initiator in one piece instead of the three pieces and two dissimilar materials currently being used, plus a glass to metal seal. This will save time, material, labor, money and increase production and quality. The new method must also eliminate the machining of the body as well as the burrs that come with the machining of the body. The improved method must further standardize the quality of the airbag initiator by eliminating the manual coupling of the pins to the body of the airbag initiator.

SUMMARY OF THE INVENTION

In accordance with one embodiment of the present invention, it is an object of the present invention to provide an improved method of manufacturing an airbag initiator.

It is another object of the present invention to provide an improved method of manufacturing an airbag initiator that eliminates the machining of the airbag initiator.

It is still another object of the present invention to provide an improved method of manufacturing an airbag initiator that eliminates the plurality of parts and different materials used in manufacturing the airbag initiator.

It is still another object of the present invention to provide an improved method of manufacturing an airbag initiator that eliminates the need for manually coupling the pins to the body of the airbag initiator.

BRIEF DESCRIPTION OF THE PREFERRED EMBODIMENT

In accordance with one embodiment of the present invention, an improved method of making an airbag initiator is disclosed. The improved method comprises the steps of: providing a feedstock to be placed in a hopper that feeds into a barrel of an injection molding machine; heating the barrel to a temperature sufficient to melt all the binders of the feedstock; injecting the feedstock into a mold under pressure to form the airbag initiator; removing the airbag initiator from the mold after allowing a sufficient amount of time for the airbag initiator to harden; removing a wax binder from the airbag initiator; removing a thermoplastic binder from the airbag initiator; and sintering the airbag initiator.

In accordance with another embodiment of the present invention, an improved method of making an airbag initiator is disclosed. The improved method comprises the steps of: providing a feedstock to be placed in a hopper that feeds a barrel of an injection molding machine; heating the barrel to a temperature sufficient to melt both a wax and a thermoplastic component of the feedstock; injecting the feedstock under pressure into a mold to form the airbag initiator; removing the airbag initiator from the mold after allowing a sufficient amount of time for the airbag initiator to harden; heating the airbag initiator in a debinding/sintering furnace, the temperature in the furnace slowly being ramped to first remove a wax binder on the airbag initiator, then ramped to remove a thermoplastic binder on the airbag initiator, and finally ramped to sinter the airbag initiator.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
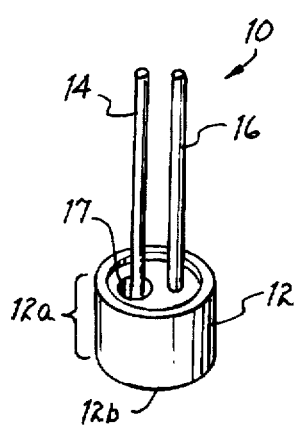
FIG. 1 shows an elevated perspective view of an airbag initiator.
Figure 2:
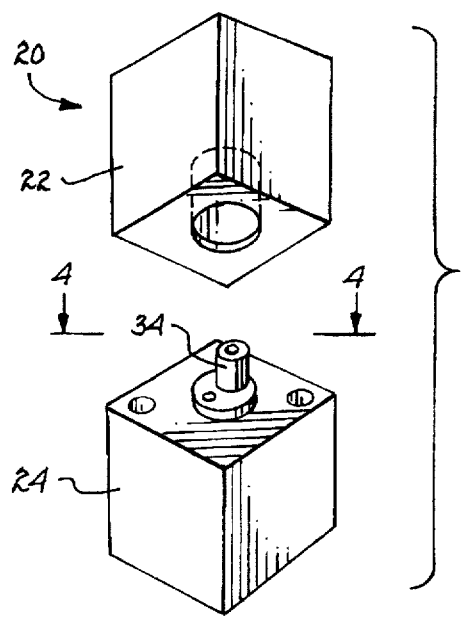
FIG. 2 shows an exploded perspective view of a mold used in the claimed method of forming an airbag initiator.
Figure 3:
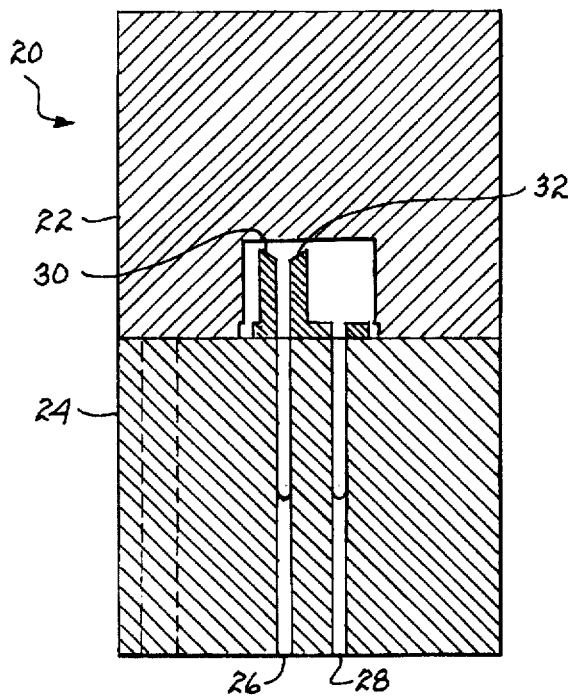
FIG. 3 is a cross-sectional view of the mold shown in FIG. 2.
Figure 4:
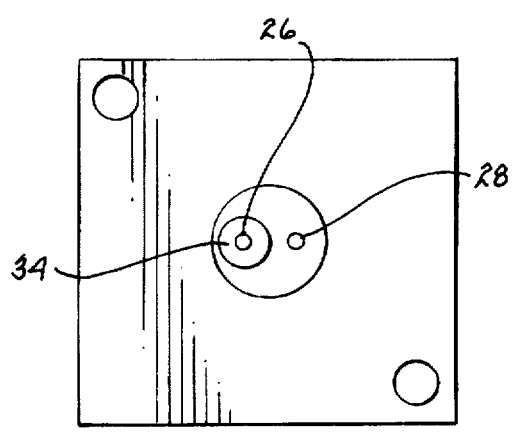
FIG. 4 is a top view of the bottom portion of the mold shown in FIG. 2.

Referring to FIG. 1, an airbag initiator (hereinafter initiator) 10 is shown. The initiator 10 is comprised of a body portion 12, a first pin 14 and a second pin 16. As stated above in the Description of the Prior Art, the body portion 12 of the initiator 10 is machined from rod stock on a lathe to the proper diameter and to put a flare (not shown) at the base of the body 12 for future welding. The body 12 is then moved to a mill where a hole 17 is drilled through the body 12 eccentric to the outside diameter of the body 12. A plurality of bodies 12 are placed into a box and shaken by hand so the bodies 12 fall into position. Another box with a plurality of first pins 14 is placed on top of the box with the aligned airbag initiator bodies 12. The top box is then shaken by hand so that a single first pin 14 will fall into the hole 17 drilled through each of the bodies 12. A glass bead (not shown) is placed over the first pin 14 and slid down the first pin 14 into the hole 17 or a glass powder (not shown) is placed in the hole 17 filling the void area. The initiator 10 is then placed in a furnace to melt the glass bead or glass powder, thereby filling the void and bonding the glass to the first pin 14 to the body 12 to form a glass to metal seal. The glass to metal seal acts as an insulator and isolates the first pin 14 from the body 12 of the initiator 10. After removing the initiator 10 from the furnace, the airbag initiator is placed in a tumbler or acid bath to remove any oxidation that may have formed on the initiator 10 during the heating in the furnace. The top of the initiator 10 is then ground or lapped flat to a specified dimension 12a on the top surface 12b of the airbag initiator 10 so that a bridge wire can be resistance welded to the body 12 and the first pin 14. A second pin 16 is then attached to the bottom of the body 12, after the location of the first pin 14 has been found to hold a tolerance of +/−0.002".

The use of metal injection molding to form the initiator 10 will decrease the cost per unit, decrease the production time per unit, and increase the quality of the initiator 10. Referring now to FIGS. 2–6, a mold 20 is shown that can be used in the metal injection molding of the initiator 40. The mold 20 is comprised of a top portion 22 and a lower portion 24. The lower portion 24 is comprised of two elongated tubular cavities 26, 28 which form the first pin 42 and the second pin 44 of the initiator 40. The lower portion 24 of the mold 20 also has angled members 30, 32 which increase the strength of the first pin 42, thereby making it more difficult for the first pin 42 to break off during the manufacturing of the initiator 10. A cylindrical member 34 extends upward from the bottom portion 24 for producing a void area 46 between the body 48 and the first pin 42 of the initiator 40. The void area 46 is where a ceramic material (not shown) such as a glass bead or glass powder is positioned to provide a glass to metal seal that isolates the first pin 42 from the body 48 of the initiator 40 after grinding of the top surface 50. The new method of making the initiator 40 by metal injection molding will allow the initiator 40 to have a first pin 42 to be within a tolerance of +/−0.001". Current methods only allow for a tolerance of +/−0.017".

In order to manufacture the initiator 40 by metal injection molding, feedstock (not shown) is placed into a hopper which feeds into a barrel of a metal injection molding machine (not shown). The feedstock is produced by mixing a powder metal with a thermoplastic and a wax in a tumbler/mixer. The powder metal is generally a gas atomized or water atomized powder metal. In the preferred embodiment of the present method, the powder metal is 316L stainless steel having a granule size less than about 22 microns. The other two ingredients of the feedstock are generally a thermoplastic such as polystyrene, polyethylene, or polypropylene and a wax such as beeswax or paraffin wax; however, note that several different types of feedstock (a proprietary mix) are well known in the art, any one of which may be implemented into the instant invention, if desired. The tumbler/mixer is heated while mixing the materials to a temperature sufficient enough to melt the thermoplastic and the wax. The continuous mixing of the ingredients while heating the tumbler allows the melted thermoplastic and wax to soak into and blend with the powder metal. The mixture is then poured from the tumbler into a container where the mixture hardens. The hardened mixture is then broken up and placed in a granulator where the mixture is granulated up into small particles called feedstock.

After the feedstock is fed into the barrel of the injection molding machine, the barrel is heated to a temperature sufficient enough to melt both the wax and thermoplastic components of the feedstock, generally around 160° C. to 190° C. The feedstock is then injected into a mold 20 under high pressure which is also being heated. The mold is generally heated to a temperature in the range of about 40° C. to 70° C. After the feedstock is injected into the mold 20, the mold is allowed to cool so that the initiator 40 will harden. In the preferred embodiment of the present method, at least ten seconds is required before opening the mold 20 to remove the initiator 40.

After the initiator 40 is removed from the mold 20, a wax binder needs to be removed from the initiator 40. The wax binder is removed by placing the initiator 40 into a furnace (not shown). The furnace is ramped up to a temperature in the range of about 750° F. to 900° F., thereby burning off the wax binder. According to another embodiment of the present method, the wax binder may also be removed by submerging the initiator 40 in a solvent and heating the solvent to a temperature sufficient to melt the wax. The solvent is generally heated to a temperature ranging from about 160° F. to 190° F. Any solvent that is capable of removing the wax binder from the initiator 40 may be used. Some examples of solvents that may be used are Methyl Ethyl Ketone (MEK) or Tri Chloral Ethylene (TCE).

After the wax binder has been removed from the initiator 40, the initiator 40 is placed in a sintering furnace (not shown). As the temperature slowly rises, a thermoplastic layer on the initiator 40 is burnt away or vaporized. As the thermoplastic layer is being burnt off or vaporized, the initiator 40 shrinks in size up to approximately 24% of the original size. Once the thermoplastic layer is removed, the temperature is further increased to a temperature just below the melting point of the stainless steel, which is about 2175° F. to 2225° F., thereby sintering the initiator 40. The sintered initiator 40 is equal to or better than standards of wrought material.

It should be noted that the wax debinding and the sintering of the initiator 40 can be done in a single furnace. In such a case, the initiator 40 is placed in the debinding/sintering furnace (not shown). The temperature in the furnace is slowly raised from a temperature ranging from about 30° C. to about 500° C. As the temperature rises, the wax binder is burnt or vaporized away. As the temperature further increases, the thermoplastic on the initiator 40 is being burnt or vaporized away, thereby shrinking the size of the initiator 40 up to approximately 24% of the original size. The temperature in the furnace is then raised to a temperature just below the melting point of the stainless steel, about 2175° F. to 2225° F., to sinter the initiator 40.

Figure 5:
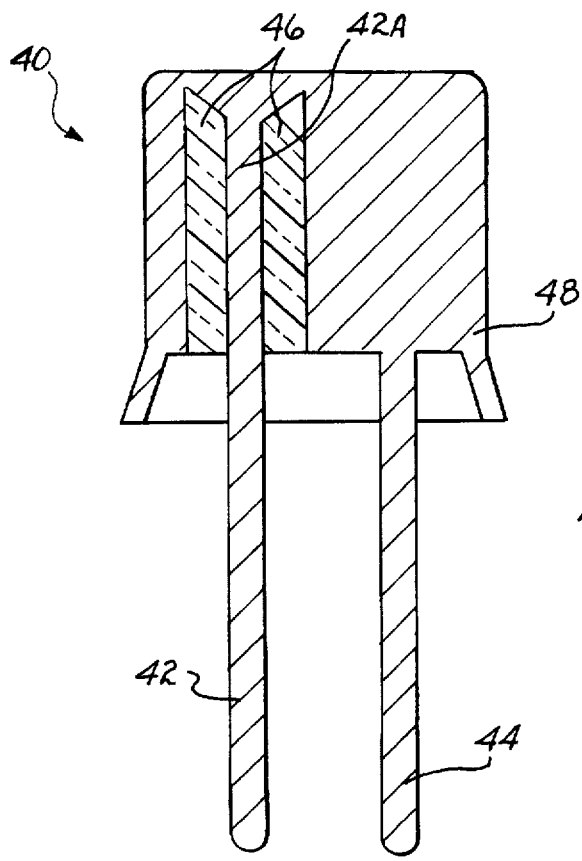
FIG. 5 shows a cross-sectional view of an airbag initiator formed by the present method.
Figure 6:
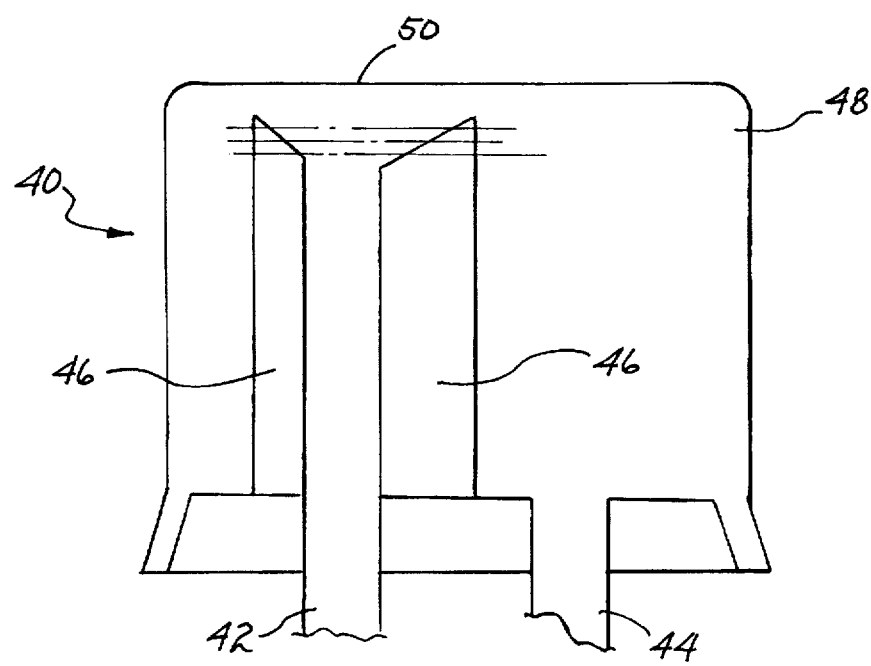
FIG. 6 shows a cross-sectional view of the body portion of the airbag initiator of FIG. 5.

Referring now specifically to FIGS. 5 and 6, an airbag initiator 40 is shown after it has been removed from the sintering furnace. The initiator 40, unlike current initiators, is comprised of a single unit as opposed to several units welded together. The initiator 40 is shown to have a first pin 42 and a second pin 44. The first pin 42 has one end 42A which is conical in nature. This conical end provides increased strength for the first pin 42 thereby making it more difficult for the first pin 42 to be broken. It should be noted that the initiator 40 could be built by metal injection molding with additional pins for backup protection.

A glass bead (not shown) is placed over the first pin 42 filling a void area 46. It should be noted that a glass power or other ceramic materials may be used to fill the void area 46. The initiator 40 is then placed in a furnace that melts the glass bead (or the glass powder or other ceramic materials that may be used) and fills the void area 46, thereby strengthening the bond between the first pin 42 and the body 48 of the initiator 40. After the glass to metal seal has been formed, the initiator 40 is taken to a tumbler or acid bath to remove any oxidation that may have formed on the initiator 40 during the melting of the glass bead. A top metal portion 50 of the initiator 40 is then ground away in order to expose the glass seal in void 46. This isolates the first pin 42 from the body 48 of the initiator 40. It should be noted that the angled members of the mold allow for different amounts of the glass to be exposed when the top metal portion 50 is grounded away. This allows a bridge wire (not shown) to be welded to the first pin 42 and to the body 48 of the initiator 40 to establish continuity (i.e. electrical flow).

While the invention has been particularly shown and described with reference to preferred embodiments thereof, it will be understood by those skilled in the art that the foregoing and other changes in form and details may be made therein without departing from the spirit and scope of the invention.

I claim:

1. A method for making an airbag initiator comprising the steps of:
   providing a feedstock to be placed in a hopper which feeds a barrel of an injection molding machine;
   heating said barrel to a temperature sufficient to melt both a wax component and a thermoplastic component of said feedstock;
   injecting said feedstock into a mold to form said airbag initiator;
   removing said airbag initiator from said mold after allowing a sufficient amount of time for said airbag initiator to harden;
   removing a wax binder from said airbag initiator;
   removing a thermoplastic binder from said airbag initiator; and
   sintering said airbag initiator.

2. The method of claim 1 further comprising the steps of:
   placing a glass bead in a void area of said airbag initiator;
   melting said glass bead to fill said void area; and
   grinding off a top portion of said airbag initiator to isolate a pin of said airbag initiator from a body portion of said airbag initiator.

3. The method of claim 1 wherein said step of providing a feedstock comprises the steps of:
   combining a powder metal with a thermoplastic and a wax in tumbler means for mixing said powder metal, said thermoplastic, and said wax;
   heating said tumbler while mixing said powder metal, said thermoplastic, and said wax to a temperature sufficient to melt said thermoplastic and said wax to blend said thermoplastic and said wax with said powder metal;
   dispensing said powder metal, said thermoplastic, and said wax into a container to harden; and
   placing a hardened mixture of said powder metal, said thermoplastic, and said wax into a granulator to grind up said hardened mixture into small particles.

4. The method of claim 3 wherein said powder metal is selected from a group consisting of gas atomized powered metal, water atomized powder metal, and mixtures thereof.

5. The method of claim 3 wherein said powder metal is 316L stainless steel having a granule size less than about 22 microns.

6. The method of claim 3 wherein said thermoplastic is selected from a group consisting of polystyrene, polyethylene, polypropylene and mixtures thereof.

7. The method of claim 3 wherein said wax is selected from a group consisting of beeswax, paraffin wax, and mixtures thereof.

8. The method of claim 1 wherein said step of heating said barrel to a temperature sufficient to melt a thermoplastic component of said feedstock further comprises the step of heating said barrel to a temperature in a range of about 160° C. to about 190° C.

9. The method of claim 1 wherein said step of injecting said feedstock into a mold further comprises the steps of heating said mold to a temperature in a range of about 40° C. to about 70° C.

10. The method of claim 1 wherein said mold to form said airbag initiator forms said airbag initiator having at least two pins, one of said at least two pins having one end being conical in nature.

11. The method of claim 1 wherein said step of allowing said airbag initiator to harden comprises the step of keeping said airbag initiator in Said mold for at least about 10 seconds.

12. The method of claim 1 wherein said step of removing a wax binder from said airbag initiator comprises the steps of:

submerging said airbag initiator in a solvent that is capable of dissolving said wax binder; and heating said solvent to a temperature in a range of about 160° F. to about 190° F.

13. The method of claim 12 wherein said solvent is selected from a group consisting of methyl ethyl ketone (MEK), trichloral ethylene (TCE), and mixtures thereof.

14. The method of claim 1 wherein said step of removing a wax binder from said airbag initiator comprises the step of heating said airbag initiator in a furnace to a temperature sufficient to burn off said wax binder.

15. The method of claim 14 wherein said temperature to burn off said wax binder ranges from about 750° F. to about 900° F.

16. The method of claim 1 wherein said step of sintering said airbag initiator comprises the steps of:

placing said airbag initiator in a sintering furnace; and increasing a temperature in said sintering furnace to a range of about 2175° F. to about 2225° F. to sinter said airbag initiator.

17. A method for making an airbag initiator comprising the steps of:

providing a feedstock to be placed in a barrel of an injection molding machine comprising the steps of:

combining a powder metal with a thermoplastic and a wax in tumbler means for mixing said powder metal, said thermoplastic, and said wax;

heating said tumbler while mixing said powder metal, said thermoplastic, and said wax to a temperature sufficient to melt said thermoplastic and said wax to blend said thermoplastic and said wax with said powder metal;

dispensing said powder metal, said thermoplastic, and said wax into a container to harden; and placing a hardened mixture of said powder metal, said thermoplastic, and said wax into a granulator to grind up said hardened mixture into small particles;

heating said barrel to a temperature sufficient to melt a thermoplastic component of said feedstock, said temperature in a range of about 160° C. to about 190° C.;

heating a mold to a temperature in a range of about 40° C. to about 70° C.;

injecting said feedstock into said heated mold to form said airbag initiator;

removing said airbag initiator from said mold after allowing a sufficient amount of time for said airbag initiator to harden, said sufficient time being at least about 10 seconds;

removing a wax binder from said airbag initiator by heating said airbag initiator in a furnace to a temperature sufficient to burn off said wax binder, said temperature ranging from about 750° F. to about 900° F.;

removing a thermoplastic binder from said airbag initiator by heating said airbag initiator in a furnace to a temperature sufficient to burn off said thermoplastic binder;

sintering said airbag initiator wherein said sintering comprises the steps of:

placing said airbag initiator in a sintering furnace; and increasing a temperature in said sintering furnace to a range of about 2175° F. to about 2225° F. to sinter said airbag initiator;

placing a glass bead in a void area of said airbag initiator;

melting said glass bead to fill said void area; and grinding off a top portion of said airbag initiator to isolate a pin of said airbag initiator from a body portion of said airbag initiator.

18. A method for making an airbag initiator comprising the steps of:

providing a feedstock to be placed in a barrel of an injection molding machine comprising the steps of:

combining a powder metal with a thermoplastic and a wax in tumbler means for mixing said powder metal, said thermoplastic, and said wax;

heating said tumbler while mixing said powder metal, said thermoplastic, and said wax to a temperature sufficient to melt said thermoplastic and said wax to blend said thermoplastic and said wax with said powder metal;

dispensing said powder metal, said thermoplastic, and said wax into a container to harden; and placing a hardened mixture of said powder metal, said thermoplastic, and said wax into a granulator to grind up said hardened mixture into small particles;

heating said barrel to a temperature sufficient to melt a thermoplastic component of said feedstock, said temperature in a range of about 160° C. to about 190° C.;

heating a mold to a temperature in a range of about 40° C. to about 70° C.;

injecting said feedstock into said heated mold to form said airbag initiator;

removing said airbag initiator from said mold after allowing a sufficient amount of time for said airbag initiator to harden, said sufficient time being at least about 10 seconds;

removing a wax binder from said airbag initiator by submerging said airbag initiator in MEK solvent and heating said MEK solvent to a temperature in a range of about 160° F. to about 190° F.;

removing a thermoplastic binder from said airbag initiator by heating said airbag initiator in a furnace to a temperature sufficient to burn off said thermoplastic binder;

sintering said airbag initiator wherein said sintering comprises the steps of:

placing said airbag initiator in a sintering furnace; and increasing a temperature in said sintering furnace to a range of about 2175° F. to about 2225° F. to sinter said airbag initiator;

placing a glass bead in a void area of said airbag initiator;

melting said glass bead to fill said void area; and grinding off a top portion of said airbag initiator to isolate a pin of said airbag initiator from a body portion of said airbag initiator.

19. The method of claim 1 wherein said step of removing a wax binder and sintering said airbag initiator comprises the steps of:

placing said airbag initiator in a debinding/sintering furnace;

increasing a temperature in said debinding/sintering furnace to a temperature in a range of about 30° C. to about 500° C. to remove said wax binder and said thermoplastic binder from said airbag initiator; and further increasing said temperature to about 2175° F. to about 2225° F. to sinter said airbag initiator.

20. A method for making an airbag initiator comprising the steps of:

providing a feedstock to be placed in a barrel of an injection molding machine comprising the steps of:
  combining a powder metal with a thermoplastic and a wax in tumbler means for mixing said powder metal, said thermoplastic, and said wax;
  heating said tumbler while mixing said powder metal, said thermoplastic, and said wax to a temperature sufficient to melt said thermoplastic and said wax to blend said thermoplastic and said wax with said powder metal;
  dispensing said powder metal, said thermoplastic, and said wax into a container to harden; and
  placing a hardened mixture of said powder metal, said thermoplastic, and said wax into a granulator to grind up said hardened mixture into small particles;
heating said barrel to a temperature sufficient to melt a thermoplastic component of said feedstock, said temperature in a range of about 160° C. to about 190° C.;
heating a mold to a temperature in a range of about 40° C. to about 70° C.;
injecting said feedstock into said heated mold to form said airbag initiator;
removing said airbag initiator from said mold after allowing a sufficient amount of time for said airbag initiator to harden, said sufficient time being at least about 10 seconds;
placing said airbag initiator in a debinding/sintering furnace;
increasing a temperature in said debinding/sintering furnace to a temperature in a range of about 30° C. to about 500° C. to remove said wax binder and said thermoplastic binder from said airbag initiator;
further increasing said temperature to about 2175° F. to about 2225° F. to sinter said airbag initiator;
placing a glass bead in a void area of said airbag initiator;
melting said glass bead to fill said void area; and
grinding off a top portion of said airbag initiator to isolate a pin of said airbag initiator from a body portion of said airbag initiator.

21. A method for making an airbag initiator comprising the steps of:
  molding feedstock into a unitary airbag initiator;
  melting an insulating material around a portion of a pin of said unitary airbag initiator; and
  grinding a surface portion of said unitary airbag initiator to expose said insulating material, thereby isolating said pin from other portions of said unitary airbag initiator.

22. An airbag initiator apparatus produced by the method of claim 1.

23. An airbag initiator apparatus produced by the method of claim 21.

24. The method of claim 1 further comprising the steps of:
  placing a ceramic material in a void area of said airbag initiator;
  melting said ceramic material to fill said void area; and
  grinding off a top portion of said airbag initiator to isolate a pin of said airbag initiator from a body portion of said airbag initiator.

25. The method of claim 1 further comprising the steps of:
  placing powder glass in a void area of said airbag initiator;
  melting said powder glass to fill said void area; and
  grinding off a top portion of said airbag initiator to isolate a pin of said airbag initiator from a body portion of said airbag initiator.

26. The method of claim 1 wherein said mold has a pair of angled members which form a pin having increased stability making it more difficult for said pin to break off.

27. The method of claim 2 wherein said mold has a pair of angled members for forming said void area and for allowing a plurality of amounts of said glass bead to be exposed when a top portion of said airbag initiator is grounded off so a bridge wire can be coupled to said pin and said body portion of said initiator.

* * * * *